(12) United States Patent
Chen et al.

(10) Patent No.: US 7,916,264 B2
(45) Date of Patent: Mar. 29, 2011

(54) LIQUID CRYSTAL DISPLAY DEVICE HAVING TEMPERATURE CONTROL SYSTEM

(75) Inventors: Xin-Sheng Chen, Shenzhen (CN); Guo-Hua Yu, Shenzhen (CN)

(73) Assignees: Innocom Technology (Shenzhen) Co., Ltd., Shenzhen, Guangdong Province (CN); Chimel Innolux Corporation, Miao-Li County (TW)

( * ) Notice: Subject to any disclaimer, the term of this patent is extended or adjusted under 35 U.S.C. 154(b) by 757 days.

(21) Appl. No.: 11/978,470

(22) Filed: Oct. 29, 2007

(65) Prior Publication Data
US 2008/0100791 A1   May 1, 2008

(30) Foreign Application Priority Data
Oct. 27, 2006   (TW) ............... 95139809 A

(51) Int. Cl.
*G02F 1/1333* (2006.01)

(52) U.S. Cl. ...... 349/161; 349/187; 250/330; 250/338.1

(58) Field of Classification Search ............. 349/161, 349/187; 250/330, 338.1
See application file for complete search history.

(56) References Cited

U.S. PATENT DOCUMENTS

| | | | |
|---|---|---|---|
| 6,115,091 A * | 9/2000 | Kondoh et al. | 349/72 |
| 6,288,700 B1 | 9/2001 | Mori | |
| 2006/0022926 A1 * | 2/2006 | Mizumaki et al. | 345/89 |
| 2006/0038129 A1 * | 2/2006 | Watanabe | 250/338.1 |
| 2006/0103682 A1 * | 5/2006 | Kunimori et al. | 345/690 |
| 2007/0085815 A1 * | 4/2007 | Oesterling et al. | 345/102 |

FOREIGN PATENT DOCUMENTS

| | | | |
|---|---|---|---|
| CN | 2503560 Y | | 7/2002 |
| JP | 06109535 A | * | 4/1994 |
| JP | 06301003 A | * | 10/1994 |
| JP | 2009008941 A | * | 1/2009 |

* cited by examiner

*Primary Examiner* — Julie-Huyen L Ngo
(74) *Attorney, Agent, or Firm* — Wei Te Chung

(57) ABSTRACT

An exemplary liquid crystal display device (2) includes a liquid crystal panel (21) and a heating system. The heating system heats the liquid crystal panel when the temperature of the liquid crystal panel is below a predetermined threshold temperature. The liquid crystal display device can work normally without being adversely influenced by the surrounding temperature.

19 Claims, 2 Drawing Sheets

LIQUID CRYSTAL DISPLAY DEVICE HAVING TEMPERATURE CONTROL SYSTEM

FIELD OF THE INVENTION

The present invention relates to liquid crystal display (LCD) devices, and particularly to an LCD device having a temperature control system.

BACKGROUND

Because LCD devices have the advantages of portability, low power consumption, and low radiation, they have been widely used in various portable information products such as notebooks, personal digital assistants (PDAs), video cameras, and the like. Furthermore, LCD devices are considered by many to have the potential to completely replace cathode ray tube (CRT) monitors and televisions.

FIG. 3 is a schematic, exploded side view of a conventional LCD device. The LCD device 1 includes a liquid crystal (LC) panel 11, and a backlight module 12 arranged under the LC panel 11. The backlight module 12 provides light beams to the LC panel 11 so that the LC panel 11 is able to display images.

The LC panel 11 includes a top substrate 191, a bottom substrate 192 parallel to the top substrate 191, and a liquid crystal layer 190 sandwiched between the top substrate 191 and the bottom substrate 192.

The backlight module 12 includes an optical film unit 13, a light guide plate (LGP) 15, a reflective plate 17, and a light source 16. The LGP 15 includes a light incident surface 151, a top light emitting surface 152 adjoining the light incident surface 151, and a bottom surface 153 adjoining the light incident surface 151. The light source 16 is a set of light emitting diodes (LEDs), and is disposed adjacent to the light incident surface 151 of the LGP 15. The optical film unit 13 is disposed adjacent to the light emitting surface 152. The reflective plate 17 is disposed adjacent to the bottom surface 153.

Light beams emitted by the light source 16 enter the LGP 15 through the light incident surface 151. Most of the light beams are reflected by the bottom surface 153 of the LGP 16, and then transmit through the light emitting surface 152. Some of the light beams transmit out of the LGP 15 through the bottom surface 153, are reflected by the reflective plate 17 back into the LGP 15, and then transmit through the light emitting surface 152. The light beams emitting from the light emitting surface 152 transmit through the optical film unit 13 to illuminate the LC panel 11.

When the light beams illuminate the LC panel 11, simultaneously, an electric field is applied between the top substrate 191 and the bottom substrate 192. Liquid crystal molecules of the liquid crystal of the liquid crystal layer 190 are driven by the electric field to rotate from one direction to another direction. The liquid crystal molecules work as light switches, and allow certain parts of the light beams to pass through the LC panel 11. Thereby, the LC panel 11 displays images.

The freezing point of the liquid crystal is about −40° C. When the temperature of the liquid crystal is in the range from −10° C. to −30° C., the liquid crystal layer 190 becomes stickier, and the liquid crystal molecules rotate slower than normal. This is liable to cause flicker and image delay. That is, the display quality of the LCD device 1 is impaired. Furthermore, when the temperature of the liquid crystal is below −40° C., the liquid crystal layer 190 may even freeze, whereupon the LCD device 1 stops working.

Accordingly, what is needed is an LCD device that can circumvent the above-described difficulties.

SUMMARY

An exemplary LCD device includes a liquid crystal panel and a heating system. The heating system heats the liquid crystal panel when the temperature of the liquid crystal panel is below a predetermined temperature.

Another exemplary LCD device includes a liquid crystal panel and a temperature control system. The temperature control system is used for maintaining the temperature of the liquid crystal panel in a predetermined threshold range.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
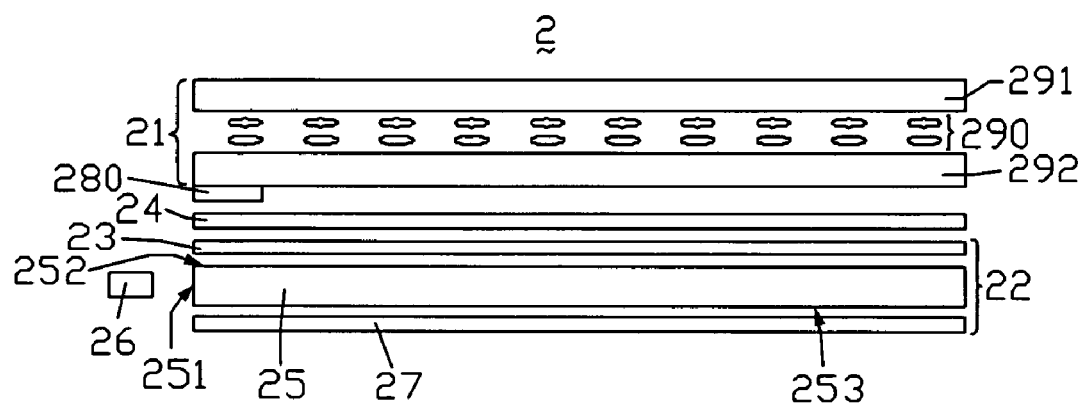
FIG. 1 is an exploded, side view of an LCD device according to a preferred embodiment of the present invention, the LCD device including a backlight module.
Figure 2:
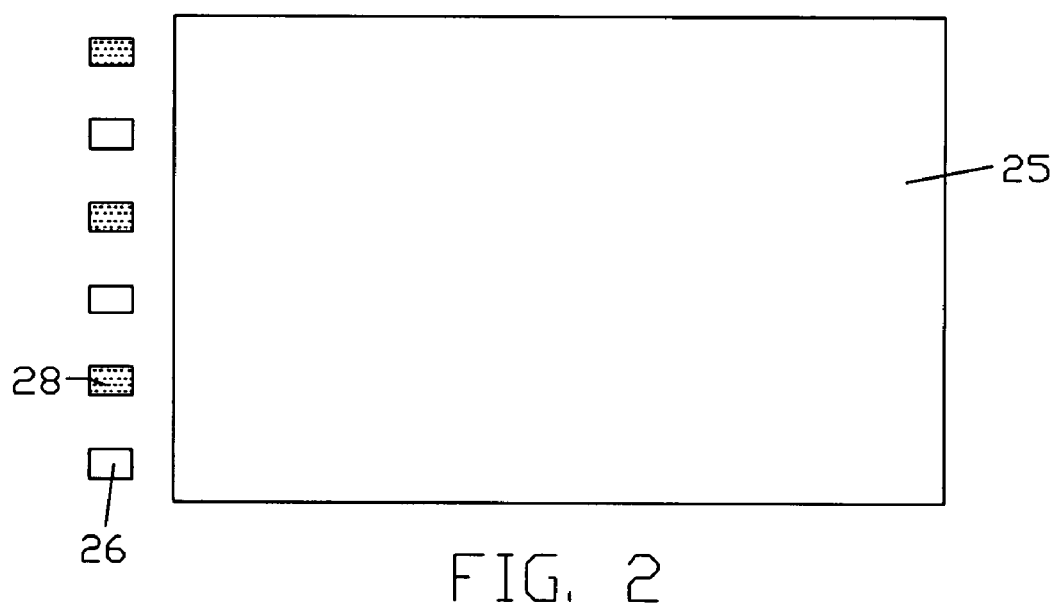
FIG. 2 is a top plan view of certain parts of the backlight module of FIG. 1.
Figure 3:
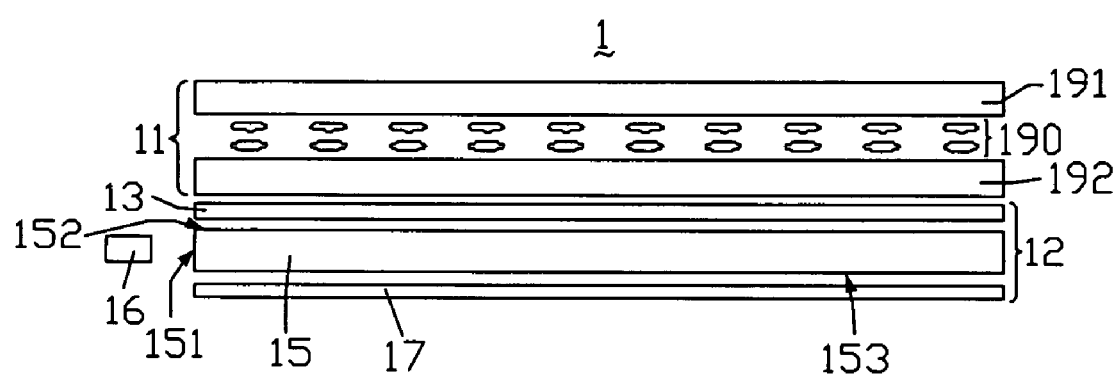
FIG. 3 is an exploded, side view of a conventional LCD device.

Referring to FIG. 1 and FIG. 2 show aspects of an LCD device according to a preferred embodiment of the present invention. The LCD device 2 includes an LC panel 21, a backlight module 22 arranged under the LC panel 21 for providing light beams to the LC panel 21, and a heating system (not labeled) for heating the LC panel 21.

The LC panel 21 includes a top substrate 291, a bottom substrate 292 parallel to the top substrate 291, and a liquid crystal layer 290 sandwiched between the top substrate 291 and the bottom substrate 292. A main central area of the LC panel 21 is defined as a display area (not labeled).

The backlight module 22 includes an optical film unit 23, an LGP 25, a reflective plate 27, and a light source 26. The LGP 25 includes a light incident surface 251, a top light emitting surface 252 adjoining the light incident surface 251, and a bottom surface 253 adjoining the light incident surface 251. The light source 26 is preferably a set of LEDs, and is disposed adjacent to the light incident surface 251 of the LGP 25. The optical film unit 23 is disposed adjacent to the light emitting surface 252. The reflective plate 27 is disposed adjacent to the bottom surface 153.

Referring also to FIG. 2, the heating system includes a temperature sensor 280, a set of infrared ray-emitting diodes 28, and an infrared ray absorbing film 24. The temperature sensor 280 is arranged on an edge portion of a bottom surface of the bottom substrate 292. Thereby, the temperature sensor 280 indirectly senses the temperature of the liquid crystal layer 290 by detecting the temperature of the LC panel 21. The infrared ray-emitting diodes 28 are arranged adjacent to the light incident surface 251 of the LGP 25. In the illustrated embodiment, the infrared ray-emitting diodes 28 and the LEDs of the light source 26 are arranged alternately along a length of the light incident surface 251. The infrared ray-emitting diodes 28 can emit infrared rays with a specific wavelength, typically over 800 nm. The LEDs of the light source 26 emit visible light with wavelengths in the range from 380 nm to 780 nm. The infrared ray absorbing film 24 is arranged between the LC panel 21 and the optical film unit 23, and faces the display area of the LC panel 21.

The infrared ray absorbing film 24 is a transparent film with high visible light transparence. The infrared ray absorbing film 24 can absorb infrared rays with a specific wavelength over 800 nm, and convert the energy of the infrared rays into thermal energy. In particular, the energy conversion occurs as follows. When infrared rays with specific frequencies irradiate the infrared ray absorbing film 24, some atomic groups or molecular groups of the infrared ray absorbing film 24 that have the same oscillation frequency as the infrared rays resonate with the infrared rays and gain kinetic energy from the infrared rays. With the accumulation of the kinetic energy, the atomic groups or the molecular groups jump from a ground state with a lower energy level to an excited state with a higher energy level. Accordingly, the temperature of the infrared ray absorbing film 24 rises to a higher temperature.

In operation of the LCD device 2, visible light beams emitted by the light source 26 enter the LGP 25 through the light incident surface 251. Most of the light beams are reflected by the bottom surface 253 of the LGP 25, and then transmit through the light emitting surface 252. Some of the light beams transmit out of the LGP 25 through the bottom surface 253, are reflected by the reflective plate 27 back into the LGP 25, and then transmit through the light emitting surface 252. The light beams emitting from the light emitting surface 252 transmit through the optical film unit 23 and the infrared ray absorbing film 24 to illuminate the LC panel 21.

The temperature sensor 280 detects the temperature of the LC panel 21. When the temperature of the LC panel 21 is below a first predetermined threshold temperature (e.g. −10° C.), the infrared ray-emitting diodes 28 are turned on and emit infrared rays. The infrared rays transmit into the LGP 25 through the light incident surface 251 and emit from the light emitting surface 252. Then the infrared rays irradiate the infrared ray absorbing film 24. The infrared ray absorbing film 24 gains energy from the infrared rays, so that the temperature of the infrared ray absorbing film 24 rises. Because the infrared rays absorbing film 24 abuts or is close to the LC panel 21, the thermal energy of the infrared ray absorbing film 24 is transferred to the LC panel 21 and heats the liquid crystal layer 290 to a higher temperature.

When the temperature of the LC panel 21 is higher than a second predetermined threshold temperature, (e.g. 20° C.), the infrared ray-emitting diodes 28 are turned off and stop emitting infrared rays.

The above-described configuration provides the LCD device 2 with the heating system. The heating system detects the temperature of the LC panel 21, and heats up the LC panel 21 when the temperature is below a predetermined threshold. This ensures that the liquid crystal layer 290 is maintained in a predetermined temperature range in which the LCD device 2 can work normally.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display device, comprising:
a liquid crystal panel; and
a heating system;
wherein the heating system heats the liquid crystal panel when the temperature of the liquid crystal panel is below a predetermined threshold temperature;
wherein the heating system comprises a temperature sensor for detecting the temperature of the liquid crystal panel;
wherein the heating system further comprises a set of infrared ray-emitting diodes for emitting infrared rays according to the temperature of the liquid crystal panel;
wherein the heating system further comprises an infrared ray absorbing film for converting the infrared rays energy into thermal energy for heating the liquid crystal panel.

2. The liquid crystal display device as claimed in claim 1, further comprising a backlight module providing surface light to illuminate the liquid crystal panel.

3. The liquid crystal display device as claimed in claim 2, wherein the backlight module comprises a light source and a light guide plate for guiding the light beams emitted by the light source to illuminate the liquid crystal panel.

4. The liquid crystal display device as claimed in claim 3, wherein the light guide plate comprises a light incident surface, the light source is a set of light emitting diodes and is arranged adjacent to the light incident surface of the light guide plate.

5. The liquid crystal display device as claimed in claim 4, wherein the infrared ray-emitting diodes are arranged adjacent to the light incident surface of the light guide plate, and each of the infrared ray-emitting diodes is arranged alternately with one of the light emitting diodes of the light source.

6. The liquid crystal display device as claimed in claim 3, wherein the light guide plate further comprises a light emitting surface, the infrared ray absorbing film is arranged between the light emitting surface and the liquid crystal panel.

7. The liquid crystal display device as claimed in claim 1, wherein the temperature sensor is arranged at the edge of the liquid crystal panel.

8. The liquid crystal display device as claimed in claim 1, wherein the heating system heats the liquid crystal panel when the temperature of the liquid crystal panel is below −10° C.

9. A liquid crystal display device, comprising:
a liquid crystal panel; and
a temperature control system for maintaining the temperature of the liquid crystal panel in a predetermined range;
wherein the temperature control system comprises a temperature sensitive element for detecting the temperature of the liquid crystal panel;
wherein the temperature control system further comprises a heating system for heating the liquid crystal panel according to the temperature of the liquid crystal panel;
wherein the heating system comprises an infrared rays emitting element and an energy-conversion element, the infrared rays emitting element emits infrared rays, the energy-conversion element converts the energy of the infrared rays into thermal energy in order to heat the liquid crystal panel.

10. The liquid crystal display device as claimed in claim 9, wherein the temperature sensitive element is arranged on the edge of the liquid crystal panel.

11. The liquid crystal display device as claimed in claim 9, wherein the infrared rays emitting element is a set of infrared ray-emitting diodes.

12. The liquid crystal display device as claimed in claim 9, wherein the energy-conversion element is an infrared ray absorbing film adjacent to the liquid crystal panel.

13. A liquid crystal display device, comprising:
a liquid crystal panel;
a backlight module comprising:
  a light source;
  a light guide plate for guiding light beams emitted by the light source to illuminate the liquid crystal panel, the light guide plate comprising a light incident surface facing the light source and a light emitting surface facing the liquid crystal panel; and
  an infrared rays emitting element adjacent to the light guide plate;
wherein when the temperature of the liquid crystal panel is below a predetermined threshold temperature, the infrared rays emitting element emits infrared rays, the infrared rays transmitting though the light guide plate and heating the liquid crystal panel.

14. The liquid crystal display device of claim 13, further comprising a temperature sensitive element for detecting the temperature of the liquid crystal panel.

15. The liquid crystal display device of claim 14, further comprising an energy-conversion element for converting at least part of energy of the infrared rays into thermal energy for heating the liquid crystal panel.

16. The liquid crystal display device of claim 13, wherein the infrared rays emitting element heats the liquid crystal panel when the temperature of the liquid crystal panel is below −10° C.

17. The liquid crystal display device of claim 13, wherein the temperature sensitive element is arranged on an edge of the liquid crystal panel.

18. The liquid crystal display device of claim 13, wherein the infrared rays emitting element is a set of infrared ray-emitting diodes.

19. The liquid crystal display device of claim 15, wherein the energy-conversion element is an infrared ray absorbing film adjacent to the liquid crystal panel.

* * * * *